Figure 1:
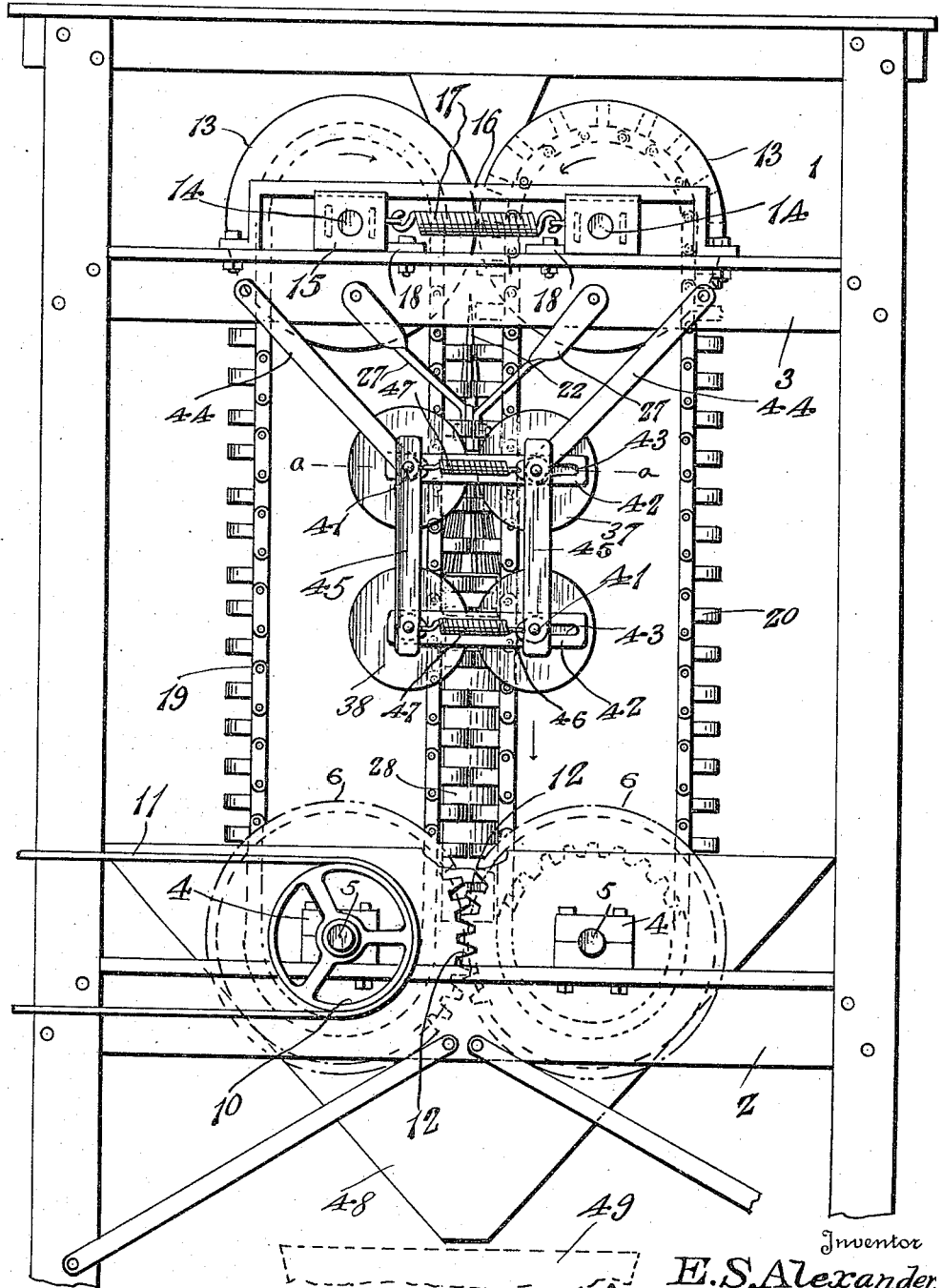

E. S. ALEXANDER.
CUCUMBER SEEDING MACHINE.
APPLICATION FILED JUNE 12, 1915.

1,183,514.

Patented May 16, 1916.
3 SHEETS—SHEET 1.

Witnesses
Inventor
E. S. Alexander.

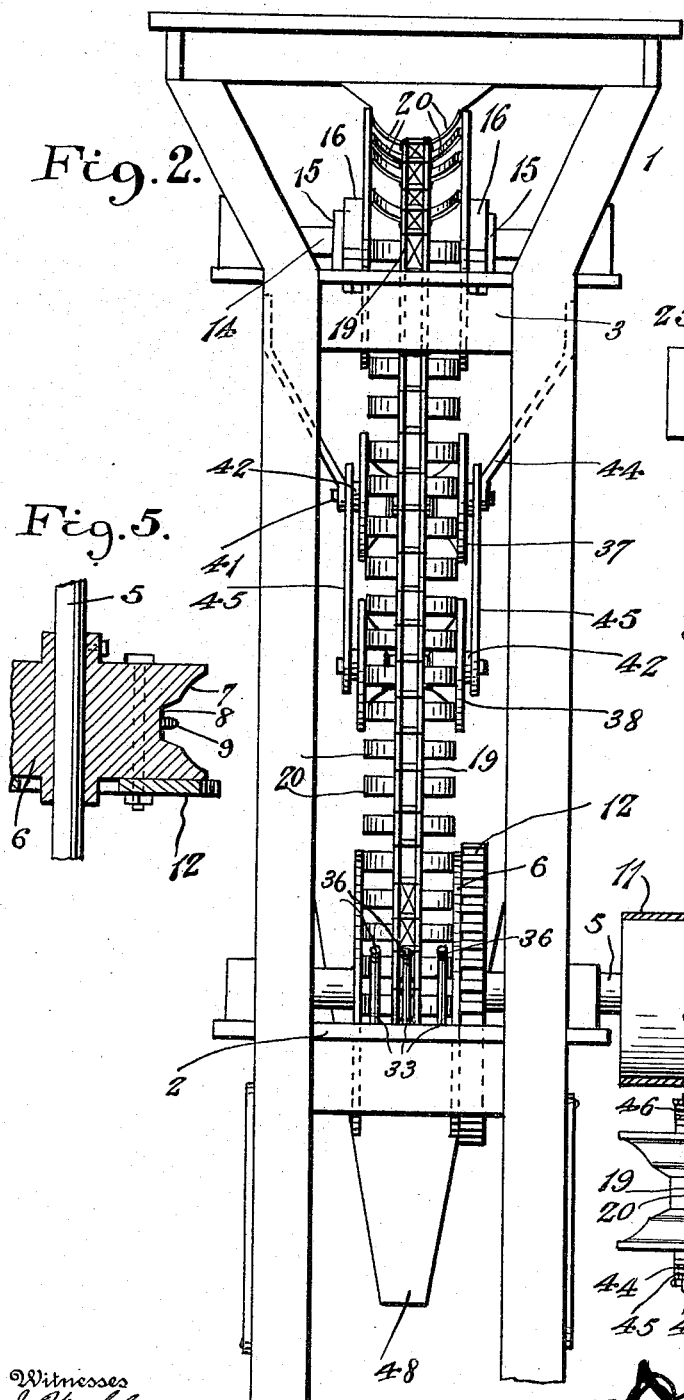

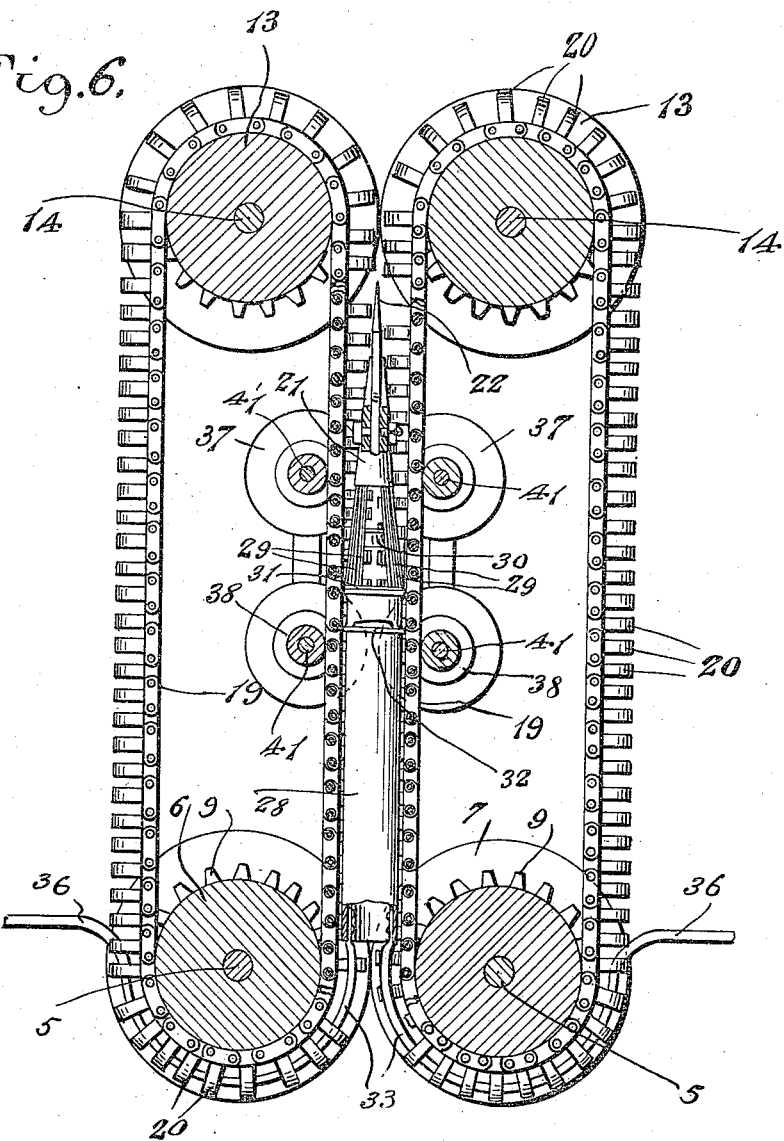

UNITED STATES PATENT OFFICE.

EARL S. ALEXANDER, OF ORANGE, NEW JERSEY.

CUCUMBER-SEEDING MACHINE.

1,183,514.  Specification of Letters Patent.  Patented May 16, 1916.

Application filed June 12, 1915.  Serial No. 33,716.

*To all whom it may concern:*

Be it known that I, EARL S. ALEXANDER, a citizen of the United States, residing at Orange, in the county of Essex and State of New Jersey, have invented certain new and useful Improvements in Cucumber-Seeding Machines; and I do hereby declare the following to be a full, clear, and exact description of the invention, such as will enable others skilled in the art to which it appertains to make and use the same.

This invention is an improved machine for splitting seed cucumbers and separating the seeds from the rinds, the object of the invention being to provide an improved machine of this kind which operates automatically, which requires but little attention and which is not likely to get out of order.

One specific object of the invention is to provide means for operating the cucumbers endwise.

Another object is to provide means for scraping the seeds from the rinds and for conveying the seeds to a receptacle.

Another object is to combine with the splitting and scraping or raking mechanism endless movable carriers for feeding the cucumbers to the splitting devices and for carrying off the cucumber rinds.

With the above and other objects in view the invention consists in the construction, combination and arrangement of devices hereinafter described and claimed.

In the accompanying drawings: Figure 1 is a side elevation of a cucumber seeding machine constructed in accordance with my invention. Fig. 2 is a similar view of the same at right angles to Fig. 1. Fig. 3 is a detail elevation, partly in section, of the cucumber splitting and seed raking devices. Fig. 4 is a horizontal sectional view on the plane indicated by the line *a*—*a* of Fig. 1. Fig. 5 is a detail sectional view of one of the lower pulleys. Fig. 6 is a detail vertical central sectional view of the splitting and seed raking devices and of the carrier and presser chains and presser pulleys which coöperate therewith.

The frame 1 may be of the form here shown or of any other suitable construction and is provided at its sides with lower cross bars 2 with upper cross bars 3. Bearing blocks 4 are bolted or otherwise secured on the lower cross bars and a pair of shafts 5 are mounted in said bearing blocks and suitably spaced apart, each of these shafts being provided with a pulley 6 which has a concave peripheral face 7 and a centrally located annular groove 8 from which projects sprocket teeth 9. One of these shafts also has a power pulley 10 for engagement by a power belt 11 wherewith to drive the machine. The concave faces of the pulleys 6 are opposed to each other and suitably spaced apart and each of these pulleys is provided on one side with an upper wheel 12, the said upper wheels engaging each other as shown in Fig. 1 so that the said pulleys 6 are revolved in opposite directions.

A pair of upper pulleys 13 which are similar in construction to the pulleys 6 have their shafts 14 mounted in bearings in pillow blocks 15 which are arranged for longitudinal movement in guides 16 on the upper sides of the bars 3 toward and from each other to vary the space between said upper pulleys 13 as may be required during the operation of the machine. The pillow blocks of each pair are connected together by springs 17 to draw the pulleys 13 toward each other, the inner limits of the movements of the pillow blocks being fixed by stops 18.

A pair of endless carrier chains 19 connect the pulleys 6 and 13 and are vertically arranged, said carrier chains being engaged with the sprocket teeth in the center annular grooves of said pulleys so that the outer sides of the carrier chains are substantially flush with the bottoms of the concave faces of the pulleys, said carrier chains being arranged in the grooves of said pulleys, as shown. The leads of the carrier chains are vertical or substantially so, the inner leads of the carrier chains, which are opposed, being suitably spaced, and the links of the carrier chains are provided with substantially semi-circular gripping fingers 20.

A substantially concentric splitter head 21 is arranged between the opposing leads of the carrier chains 19, is provided at its upper end with a knife 22 which is arranged in a vertical plane and presents an upper sharpened edge, a second knife 24 projecting from opposite sides of the splitter head and being arranged immediately below and at right angles to the knife 22. A cross bar 25 passes through the splitter head immediately below the knife 24, is secured to the splitter head as by means of a cross pin 26, and the ends of said cross bar, which project from opposite sides of the splitter head are secured between the lower ends of pairs of downwardly converging hangers 27 the upper ends of which are secured to the bars 3.

A vertically arranged seed tube 28, which is concentrically related to the splitter head has its upper end arranged a suitable distance below the splitter head and connected thereto by upwardly converging spaced bars 29 which are flush with the concentric face of the splitter head and in effect form lower continuations. A ranking annulus 30 which is of inverted frusto conical form is arranged between the bars 29 and secured thereto at a point above the splitter head and the seed tube. A raking cup 31 is formed at the upper end of the seed tube and a similar raking cup 32 is formed on the seed tube at a suitable distance below its upper end. Rind separating rods 33 have vertical upper portions 34 the upper ends of which are secured as at 35 in the seed tube at the lower end of the latter, and at the lower ends of the vertical portions 34 of said rind separating rods are semi-circular outwardly extending discharge portions 36 which pass around the under sides of the lower pulleys 6 and are concentrically related thereto. The splitter head and seed tube, which are vertically arranged, are arranged between the opposing or inner leads of the carrier chains as shown. I also provide a pair of upper presser rollers 37 and a pair of lower presser rollers 38 which have concave peripheral faces 39 and annular grooves 40 at their centers to receive the opposing leads of the carrier chains, the concave peripheries of said presser rollers, like those of the pulleys 6—13 receiving the gripping fingers 20 of the carrier chains and said gripping fingers, on the inner leads of the carrier chains being arranged on opposite sides of the splitter head and seed tube so as to pass downwardly thereon and in close proximity thereof. The shafts 41 of said presser coils are mounted in bearings in horizontally arranged bars 42 each of which has slots 43 admitting of the lateral movement of one of said shafts with its presser roller. The upper shafts 41 have bearings in the lower ends of pivotally mounted hangers 44 and also in the upper ends of vertical links 45, the lower shafts 41 also having bearings near the lower ends of said vertical links. Links or washers 46 are mounted on the shafts 41 near their outer ends and connected by springs 47, said springs serving to draw the presser rollers and hence also the opposing leads of the carrier chains toward each other and on opposite sides of the splitter head and seed tube.

In the operation of my improved cucumber seeding machine the cucumbers, arranged vertically are fed in the upper end of the machine, with one end downward, between the upper pulleys 13 and are caught by the gripping fingers of the carrier chains and pulled downwardly with the inner leads of the outer carrier chains. The splitter head is directly in the path of the cucumbers so that each cucumber is split endwise in half by the knife 23, the knife 24 serving to open the ends so that the rinds will lay the closer to the rakes. Hence, the halves of the cucumbers are pressed by the presser rollers against opposite sides of the splitter head and the bars 29 while being carried downwardly by the chains and their gripping fingers and hence the seeds are raked from the inner sides of the rinds by the raker annulus 30 and the cups 31—32, the seeds passing between the bars 29 into the seed tube 28 and dropping through the latter and a suitable spout or hopper 48 into a suitable receiving vessel 49. The rinds as they are moved downwardly by the carrier chains are caught between the latter and the rind separator rods 33, said rods coacting with the lower pulleys 6 to discharge the rinds from opposite sides of the machine, outwardly at the outer ends of said rods, as will be understood.

Having thus described my invention, I claim:

1. In combination with a splitter head, splitter knives at the upper end of the head, spaced bars below the head, a seed tube leading downwardly from said bars and seed raking means between said bars and on said tube, a pair of flexible endless carrier elements, arranged with opposing leads on opposite sides of said splitter head bars and seed tube and means to operate said endless carrier elements.

2. In combination with a splitter head, splitter knives at the upper end of the head, spaced bars below the head, a seed tube leading downwardly from said bars and seed raking means between said bars and on said tube, a pair of flexible endless carrier elements, arranged with opposing leads on opposite sides of said splitter head bars and seed tube and means to operate said endless carrier elements, and gripping fingers with which said carrier elements are provided.

3. In combination with a splitter head, splitter knives at the upper end of the head, spaced bars below the head, a seed tube leading downwardly from said bars and seed raking means between said bars and on said tube, a pair of flexible endless carrier elements, arranged with opposing leads on opposite sides of said splitter head bars and seed tube and means to operate said endless carrier elements, and presser rollers arranged on opposite sides of the opposing leads of said endless carrier elements and also on opposite sides of said splitter head bars and seed tube and serving to subject material to pressure between the leads of the carriers and said splitter head bars and seed tube.

4. In combination with a splitter head, splitter knives at the upper end of the head, spaced bars below the head, a seed tube leading downwardly from said bars and seed raking means between said bars and on said tube, a pair of flexible endless carrier elements, arranged with opposing leads on opposite sides of said splitter head bars and seed tube and means to operate said endless carrier elements, and presser rollers arranged on opposite sides of the opposing sides of said splitter head bars and seed tube and serving to subject material to pressure between the leads of the carriers and said splitter head bars and seed tube and rind separating rods leading from the lower end of said seed tube.

5. In combination with a splitter head, splitter knives at the upper end of the head, spaced bars below the head, a seed tube leading downwardly from said bars and seed raking means between said bars and on said tube, a pair of flexible endless carrier elements, arranged with opposing leads on opposite sides of said splitter head, bars and seed tube and means to operate said endless carrier elements, and presser rollers arranged on opposite sides of the opposing sides of said splitter head bars and seed tube and serving to subject material to pressure between the leads of the carriers and said splitter head bars and seed tube and rind separating rods leading from the lower end of said seed tube, and also leading outwardly in opposite directions.

6. A cucumber slicing machine comprising a frame, cross bars secured to the upper and lower ends of said frame, a pair of shafts journaled upon the lower cross bar in spaced relation, pulleys mounted upon said shafts, a second pair of shafts journaled upon the upper cross bar and one of said shafts adapted to be slidably mounted upon said cross bar, tension means connected to the second mentioned shaft, means for rotating the first mentioned pulleys in opposite directions, a pair of endless carriers mounted upon said pulleys, means for splitting and scraping the seeds from the cucumber positioned between said endless carriers, tension means positioned intermediate the pairs of pulleys and adapted to bear upon the endless carriers.

7. A cucumber slicing machine comprising a frame, cross bars secured to the lower and upper ends of the frame, pulleys rotatably mounted on the lower cross bar, means for rotating said pulleys in opposite directions, two pairs of bearings mounted on the upper cross bars, one pair of said bearings adapted to slide longitudinally of the upper cross bars, a spring connecting said bearings in pairs, shafts journaled in said bearings, pulleys mounted on said shafts, a pair of carriers mounted on said pulleys, a splitter and seeder positioned between said carriers and tension means adapted to bear upon said carriers.

8. A cucumber slicing machine comprising a frame, cross bars secured to the lower and upper ends of said frame, a pair of spaced pulleys journaled on the cross bars, endless carriers mounted on said pulleys, semi-circular fingers formed on the endless carriers, a splitter and seeder positioned between said endless carriers, and tension means adapted to bear upon said carriers.

9. A cucumber slicing machine comprising a frame, cross bars secured to the lower and upper ends of said frame, a pair of spaced pulleys journaled on the cross bars, endless carriers mounted on said pulleys, a splitter and seeder positioned between said endless carriers, hangers secured to the upper cross bars, a pair of horizontal bars connected to the free ends of said hangers, a pair of shafts journaled in said horizontal bars, and one of said shafts adapted to slide longitudinally of the longitudinal bars, links connected to said horizontal bars, a second pair of horizontal bars secured to the free ends of said links, shafts journaled in the second mentioned horizontal bars and one of said shafts adapted to slide longitudinally thereof, pulleys mounted on said shafts, springs connected to the pairs of shafts and adapted to bring the pulley into engagement with the endless carriers.

10. In combination with a splitter head, splitter knives at the upper end of the head, spaced bars below the head, a seed tube leading downwardly from said bars and seed raking means between said bars and on said tube, a pair of flexible endless carrier elements arranged with opposing leads on opposite sides of said splitter head and bars and seed tube and means to operate said endless carrier elements, and presser rollers arranged on opposite sides of the opposing sides of said splitter head bars, and seed tube, and serving to subject material to pressure between the leads of the carriers, rind separating rods connected to said seed tube and bent to conform with the curvature of the lower ends of said carriers within the leads of the carriers and said rind separating rods having their free ends bent at right angles to the carriers.

In testimony whereof I affix my signature in presence of witnesses.

EARL S. ALEXANDER.

Witnesses:
FREDERICK EGNER,
THOMAS J. McDEVITT,
T. E. McGUNK.